(12) United States Patent
Boland et al.

(10) Patent No.: US 11,577,699 B2
(45) Date of Patent: Feb. 14, 2023

(54) WINDSCREEN WIPER DEVICE

(71) Applicants: TRICO BELGIUM SA, Aubange (BE); DR.ING. H.C.F. PORSCHE AG, Stuttgart (DE)

(72) Inventors: Xavier Boland, Arlon (BE); Sven Auch, Stuttgart (DE)

(73) Assignees: TRICO BELGIUM S.A.; DR.ING. H.C.F. PORSCHE AG

(*) Notice: Subject to any disclaimer, the term of this patent is extended or adjusted under 35 U.S.C. 154(b) by 62 days.

(21) Appl. No.: 17/277,332

(22) PCT Filed: Sep. 18, 2018

(86) PCT No.: PCT/EP2018/075197
§ 371 (c)(1),
(2) Date: Mar. 18, 2021

(87) PCT Pub. No.: WO2020/057729
PCT Pub. Date: Mar. 26, 2020

(65) Prior Publication Data
US 2021/0354664 A1    Nov. 18, 2021

(51) Int. Cl.
*B60S 1/34* (2006.01)
*B60S 1/40* (2006.01)
*B60S 1/38* (2006.01)

(52) U.S. Cl.
CPC ............ *B60S 1/3431* (2013.01); *B60S 1/345* (2013.01); *B60S 1/3447* (2013.01); *B60S 1/38* (2013.01); *B60S 1/4087* (2013.01)

(58) Field of Classification Search
CPC ............ B60S 1/38; B60S 1/3853; B60S 1/34
See application file for complete search history.

(56) References Cited

U.S. PATENT DOCUMENTS 9,096,195 B2 *   8/2015   Boland ................... B60S 1/381
2013/0125332 A1 *  5/2013   Boland ..................... B60S 1/38
                                                  15/250.32
(Continued)

FOREIGN PATENT DOCUMENTS

| DE | 102012112526 | 8/2014 |
| FR | 2382357 | 9/1978 |
| WO | 2012065639 | 5/2012 |

(Continued)

*Primary Examiner* — Michael D Jennings
(74) *Attorney, Agent, or Firm* — Bryan Cave Leighton Paisner LLP (57) ABSTRACT

A windscreen wiper device comprising an elongated wiper blade of a flexible material, a connecting device, a mounting head, and a longitudinal strip-shaped arm. The wiper blade is adapted to be placed in abutment with a windscreen to be wiped. The wiper blade includes at least one groove in which an elastic, elongated carrier element is disposed. The connecting device is connected to the wiper blade. The mounting head transfers a reciprocal movement to the wiper blade. The longitudinal strip-shaped arm has a first end detachably connected to the mounting head through a snapping operation and a second end detachably connected to the connecting device through a snapping operation. The arm is made of a resilient material and is biased to exert a pressure onto the wiper blade towards the windscreen to be wiped.

16 Claims, 7 Drawing Sheets

(56) References Cited

U.S. PATENT DOCUMENTS

| | | | |
|---|---|---|---|
| 2016/0101762 A1* | 4/2016 | Boland | B60S 1/0461 29/428 |
| 2016/0137168 A1* | 5/2016 | Friscioni | B60S 1/522 15/250.04 |

FOREIGN PATENT DOCUMENTS

| | | |
|---|---|---|
| WO | 2016119852 | 8/2016 |
| WO | 2017140343 | 8/2017 |

* cited by examiner

WINDSCREEN WIPER DEVICE

BACKGROUND OF THE INVENTION

A windscreen wiper device is generally known from European patent publication no. 1 514 752 of the same Applicant. The windscreen wiper device described in this European patent publication comprises a mounting head mountable on a drive shaft and an arm member pivotally connected to the mounting head by means of a pivot pin. The arm member has a substantially U-shaped cross-section having two side walls near the pivot pin. A part of the mounting head extends between the side walls and beyond the pivot pin.

A disadvantage of this windscreen wiper arm is that it comprises many complex parts with a dedicated shape. The oscillating arm described therein consists of a plastic arm member. One end of the arm member is pivotally connected to a mounting head by means of a pivot pin, and the other end of the arm member is folded around a rod-like part. This type of windscreen wiper arm needs complex machinery and tools, with all the expenses involved.

SUMMARY OF THE INVENTION

The present invention relates to a windscreen wiper device, particularly for automobiles, comprising an elongated wiper blade of a flexible material, which can be placed in abutment with a windscreen to be wiped. The wiper blade is of the flat blade type and includes at least one groove in which an elastic, elongated carrier element is disposed. The windscreen wiper device further comprises a mounting head for transferring a reciprocal movement to the wiper blade. The wiper blade is preferably made in one piece through extrusion. The longitudinal groove is preferably a central longitudinal groove accommodating the carrier element. The carrier element is also called a "flexor." The wiper blade is designed as a so-called "flat blade" or "yokeless blade," where no use is made of several yokes pivotally connected to each other. The wiper blade is biased by the carrier element, and thus exhibits a specific curvature.

The present invention is not restricted to cars, but also refers to rail coaches and other (fast) vehicles.

It is an object of the invention to provide, at minimum costs—without using complex machinery and additional tools—a simple though effective windscreen wiper device which fits on all kinds of different cars.

According to the invention, the windscreen wiper device further comprises a longitudinal strip-shaped arm. A first end of the arm is directly (i.e. without any other intermediate parts) and detachably connected to the mounting head through a snapping operation. A second end of the arm is directly (i.e. without any other intermediate parts) and detachably connected to a connecting device of the wiper blade through a snapping operation. The arm is preferably made of a resilient material, and is biased in order to exert a pressure onto the wiper blade towards the windscreen to be wiped. Thus, the strip-shaped arm at both free ends is detachably connected through a snapping operation to the mounting head on the one hand and to the connecting device on the other hand, so that different types of strip-shaped arms, mutually differing in length, can be attached to the mounting head and the connecting device, respectively. Hence, the mounting head and the connecting device are universal components for different cars, i.e. equipped with different types of strip-shaped arms, mutually differing in length. Further, the mounting head and the connecting device are also universal components for different cars, i.e. equipped with different types of strip-shaped arms, mutually differing in resiliency ("or elasticity") for transmitting mutually different forces on the wiper blade in order to press the wiper blade onto the windscreen to be wiped. In the present invention, using the resiliency ("or elasticity") of the arm to press the wiper blade onto the windscreen to be wiped not only ensures that less parts have to be used in manufacturing the windscreen wiper device with all advantages involved (such as being cheaper and lighter), but also obviates certain disadvantages, such as wear. Preferably, the arm has the shape of a flat wire being biased (i.e., pre-bent) to press the wiper blade onto the windscreen to be wiped. More preferably, the resilient material of the arm is corrosion resistant. The use of the arm allows a great flexibility in the length thereof, dependent on the automobile involved.

The connecting device, the mounting head and the arm are each preferably made of one piece. The connecting device is particularly made in one piece of plastic. The mounting head is particularly made of one piece of plastic with a metal insert, preferably an aluminum insert with the plastic molded around the insert. The present windscreen wiper device is particularly designed for use at a rear window of a car.

Preferably, the wiper blade includes opposing longitudinal grooves on its longitudinal sides. Spaced-apart longitudinal strips of the carrier element are disposed in the opposing longitudinal grooves. Neighboring ends of the longitudinal strips are interconnected by a respective connecting piece or "end cap." The connecting device may be glued, soldered, clipped, snapped or welded onto the longitudinal strips.

Preferably, the arm is biased in such a way that its curvature near the mounting head is larger than its curvature near the connecting device, all seen in a dismounted position. In other words, in the dismounted position, the arm has an asymmetric shape, seen along its middle transverse plane perpendicular to a windscreen to be wiped. Thus, the wiper blade is able to follow any curvature of a windscreen to be wiped, while the wiper blade is pressed onto the windscreen to be wiped with sufficient force to enhance the wiping properties.

In a preferred embodiment of a windscreen wiper device in accordance with the invention, the connecting device comprises at least one resilient tongue engaging in a correspondingly shaped hole provided in the arm near the second end thereof. The resilient tongue is hingeable between a wiping position retaining the wiper blade onto the arm and a lift position releasing the wiper blade from the arm. In the lift(ing) position, the arm is lifted in a direction away from the windscreen to be wiped, so that the wiper blade can be replaced, repaired and the like. Thus, the connecting device with the wiper blade is mounted onto the strip-shaped arm as follows. The connecting device can be easily slid on the second free end of the strip-shaped arm. During this sliding movement, the resilient tongue of the connecting device is initially pushed in against a spring force and then allowed to spring back into the hole in the strip-shaped arm, thus snapping, that is clipping, the resilient tongue into the hole of the strip-shaped arm. This is a so-called bayonet-connection. Particularly, the hole provided in the arm near the second end thereof has a closed circumference. Hence, the resilient tongue is firmly snapped in the closed hole along its entire circumference. Preferably, the resilient tongue extends in a longitudinal direction away from the mounting head.

In a further preferred embodiment of a windscreen wiper device according to the invention, the connecting device comprises a first part and a second part. The arm can be pivotally connected to the first part about a pivot axis, with the interposition of the second part. The second part comprises the resilient tongue. The first part is connected to the wiper blade and the second part is detachably connected to the first part. Preferably, the second part is connected to the first part by pivotally engaging protuberances of the first part, at the location of the pivot axis, in recesses provided in the second part. More preferably, the second part has a substantially U-shaped cross-section. A base of the U-shaped cross-section comprises the resilient tongue, and legs of the U-shaped cross-section comprise the recesses. The second part acts as a joint part and is also called an "adapter." Preferably, the second part is clipped onto the strip-like arm through the bayonet-connection described above and stays on the strip-like arm. In other words, mounting or dismounting the wiper blade onto or from the strip-like arm is realized by clipping or unclipping the first part (together with the wiper blade) onto or from the second part already clipped onto the strip-like arm through the bayonet-connection. Hence, the protuberances of the first part clip or unclip inside or outside the recesses of the second part through a snapping operation, during mounting or dismounting.

In a further preferred embodiment of a windscreen wiper device in accordance with the invention, the mounting head comprises at least one resilient tongue engaging in a correspondingly shaped hole provided in the arm near the first end thereof. The resilient tongue is hingeable between a wiping position retaining the arm onto the mounting head and a lift position releasing the arm from the mounting head. Thus, the strip-shaped arm is mounted onto the mounting head as follows. The first free end of the strip-shaped arm is easily slid onto the mounting head. During this sliding movement the resilient tongue of the mounting head is initially pushed in against a spring force and then allowed to spring back into the hole in the strip-shaped arm, thus snapping, that is clipping, the resilient tongue into the hole of the strip-shaped arm. As indicated earlier, this is a so-called bayonet-connection. Dismounting the strip-shaped arm from the mounting head is thus realized by unclipping the strip-shaped arm from the mounting head. The hole provided in the arm near the first end thereof preferably has a closed circumference. The resilient tongue of the mounting head preferably extends in a longitudinal direction towards the mounting head.

In a further preferred embodiment of a windscreen wiper device according to the invention, the mounting head is fixed for rotation to a shaft. The shaft is rotatable alternately in a clockwise and in a counter-clockwise sense carrying the mounting head into rotation. Thus, in turn the mounting head draws the connecting device into rotation and thereby moves the wiper blade. In the alternative, the mounting head is fixed for translation to a carriage, where the carriage can be translated alternately in a linear direction and in another counter linear direction carrying the mounting head into translation. The present invention can therefore be used for circular or linear movement of the mounting head.

In a further preferred embodiment of a windscreen wiper device in accordance with the invention, an elongated cap is connected to at least one of the mounting head, the arm and the connecting device. The cap participates in the torsional rigidity of the arm. Further, the cap avoids permanent deformation of the arm. Particularly, the mounting head has two opposite side walls at the location of its attachment to the cap. Each side wall comprises a guiding groove cooperating with an inwardly extending protrusion on a wall of the cap. More in particular, the protrusion comprises a lateral rib to limit movement of the arm in a direction away from the windscreen to be wiped from a wiping position into a lift position.

In a further preferred embodiment of a windscreen wiper device according to the invention, the windscreen wiper device further comprises two connecting pieces each positioned near an end of the wiper blade and connected to an end of the carrier element.

The present invention also relates to a strip-shaped arm arranged to be directly and detachably connected near a first end thereof to a mounting head of a windscreen wiper device through a snapping operation and arranged to be directly and detachably connected near a second end thereof to a connecting device of a wiper blade of a windscreen wiper device through a snapping operation. The arm is preferably made of a resilient material and biased in order to exert a pressure onto the wiper blade towards a windscreen to be wiped. Preferably, the arm comprises a first hole arranged to cooperate with a resilient tongue of the connecting device. The resilient tongue of the connecting device is movable between a wiping position retaining the wiper blade onto the arm, and a lift position releasing the wiper blade from the arm. The arm also preferably comprises a second hole arranged to cooperate with a resilient tongue of the mounting head. The resilient tongue of the mounting head is movable between a wiping position retaining the arm onto the mounting head and a lift position releasing the arm from the mounting head.

The present invention further relates to a second part of the connecting device, also called an "adapter," comprising a resilient tongue that is movable between a wiping position retaining the second part onto a strip-shaped arm, and a lift position releasing the second part from the arm. The second part (together with the arm) is arranged to be detachably connected to a first part of the connecting device, where the first part is connected to the wiper blade by protuberances of the first part pivotally engaging into recesses of the second part.

BRIEF DESCRIPTION OF THE DRAWINGS

The invention will now be explained more in detail with reference to figures illustrated in a drawing, wherein.

DETAILED DESCRIPTION OF PREFERRED EMBODIMENTS

Figure 1:
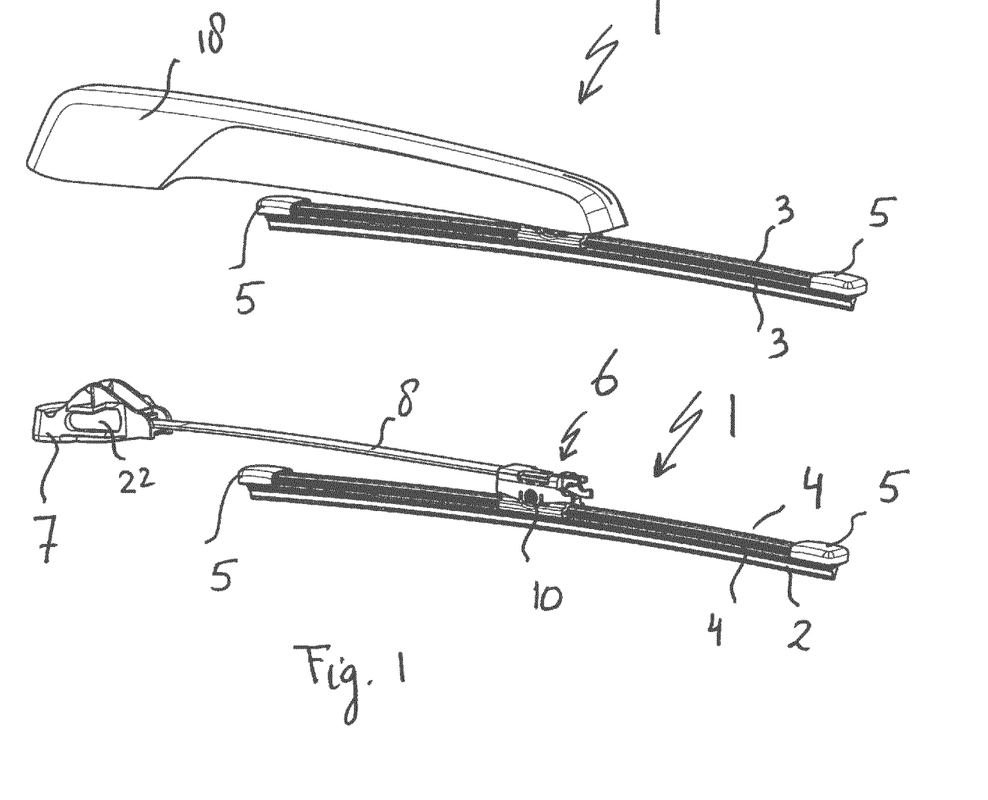
FIG. 1 shows a perspective view of a preferred embodiment of a windscreen wiper device according to the invention, illustrated both with and without a cap.
Figure 2:
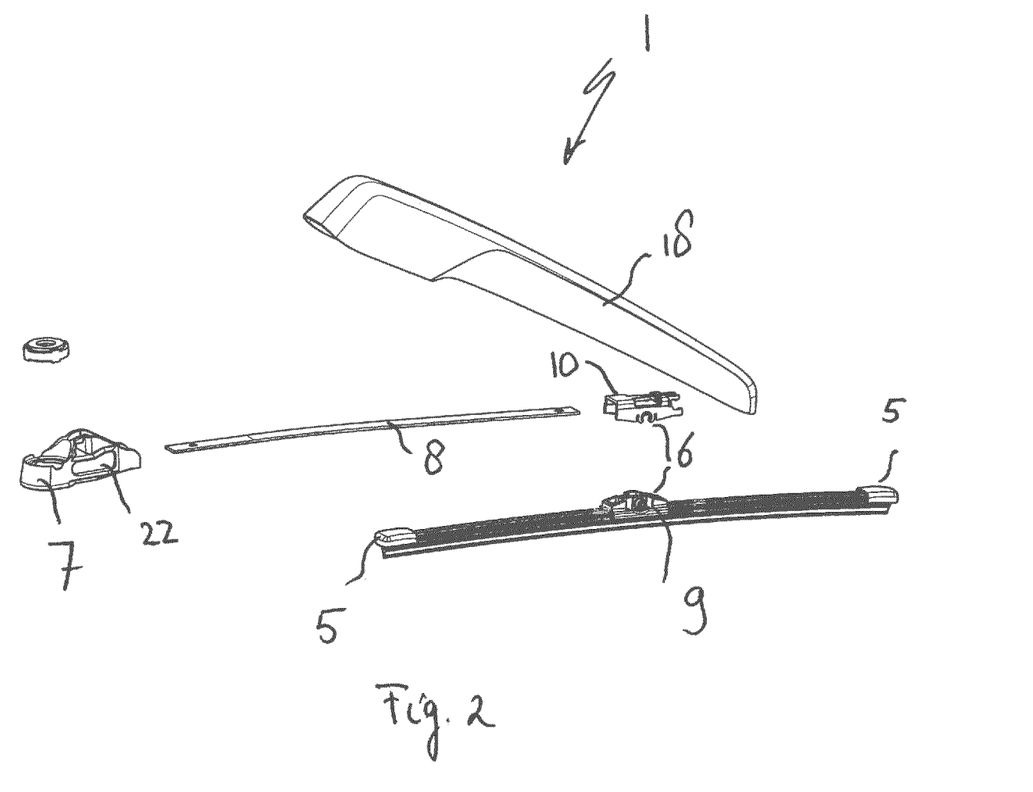
FIG. 2 shows an exploded perspective view of the windscreen wiper device of FIG. 1.

With reference to FIGS. 1 and 2, a windscreen wiper device 1 comprises an elastomeric wiper blade 2. Opposing longitudinal grooves 3 are formed in the longitudinal sides of the elastomeric wiper blade 2, and longitudinal strips 4 made of spring band steel are fitted in the longitudinal grooves 3. The strips 4 form a flexible carrier element for the wiper blade 2, as it were, which is thus biased in a curved position (the curvature in operative position being that of a windscreen to be wiped). Neighboring ends of the strips 4 at both ends of the wiper blade 2 are interconnected by means of connecting pieces 5 or "end caps" functioning as clamping members. In this embodiment, the connecting pieces 5 are each a separate constructional element, which may be form-locked ("positive locking" or "having a positive fit") or force-locked to the ends of the strips 4. In another preferred embodiment, the connecting pieces 5 are in one piece with the strips 4 made of spring band steel. In the latter case, the connecting pieces 5 form transverse bridges for the strips 4, as it were.

The windscreen wiper device 1 further comprises a connecting device 6 of plastic material to be connected to a mounting head 7 with the interposition of an elastic flat strip-like arm 8 or "wire" made of band steel. Alternatively, the connecting device 6 may also be made of metal, such as steel or aluminum. The connecting device 6 comprises a first part 9 acting as a connector base having clamping members, which engage around longitudinal sides of the strips 4 that face away from each other. Thus the first part 9 of the connecting device 6 is firmly attached to the unit consisting of the wiper blade 2 and the strips 4. Further, the connecting device 6 comprises a second part 10 functioning as a joint part or "adapter" that is detachably connected to the first part 9 of the connecting device 6 by engaging cylindrical protrusions 11 of the first part 9 in co-axial cylindrical recesses 12 provided in the second part 10 of the connecting device 6 (see FIGS. 3 and 5). As shown, the protrusions 11 extend outwards on either side of the first part 9. The first and second parts 9, 10 of the connecting device 6 are snappingly and pivotally connected around a pivot axis at the location of the protrusions 11. As can be seen, the connecting device 6 is connected to the wiper blade 2 near its middle transversal plane.

Figure 3:
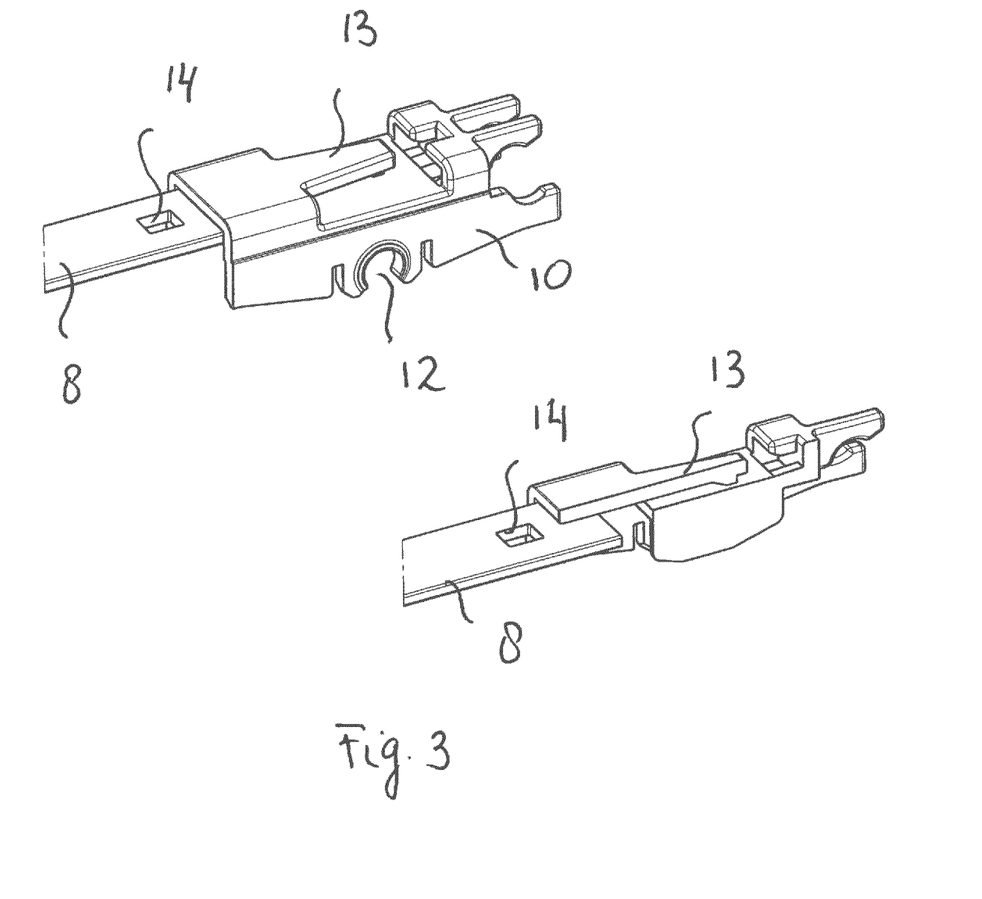
FIG. 3 shows a perspective view of a part of the windscreen wiper device of FIGS. 1 and 2, partly in cross-section, showing the interconnection of the strip-shaped arm and a connecting device.
Figure 5:
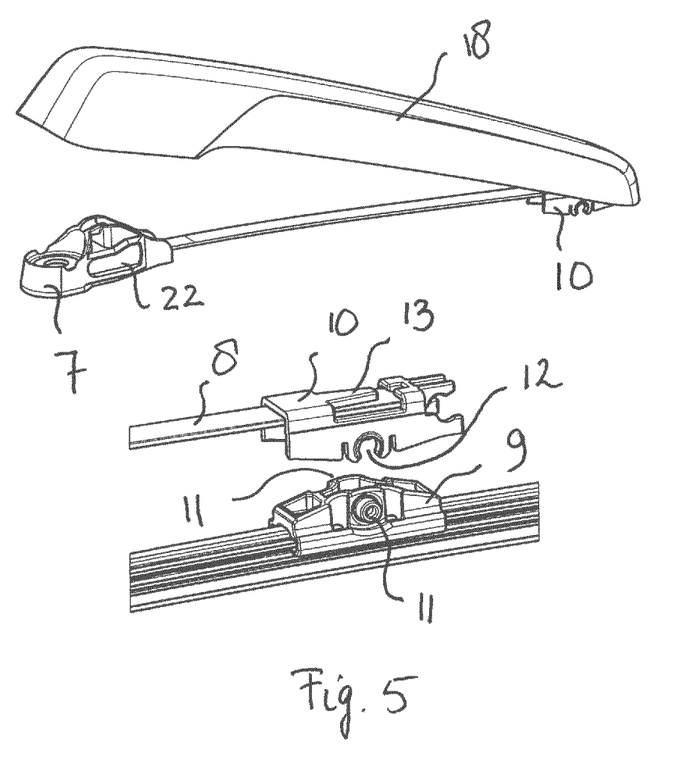
FIG. 5 shows details of the windscreen wiper device of FIGS. 1 and 2 to illustrate the mounting and dismounting of a wiper blade onto the arm.
Figure 6:
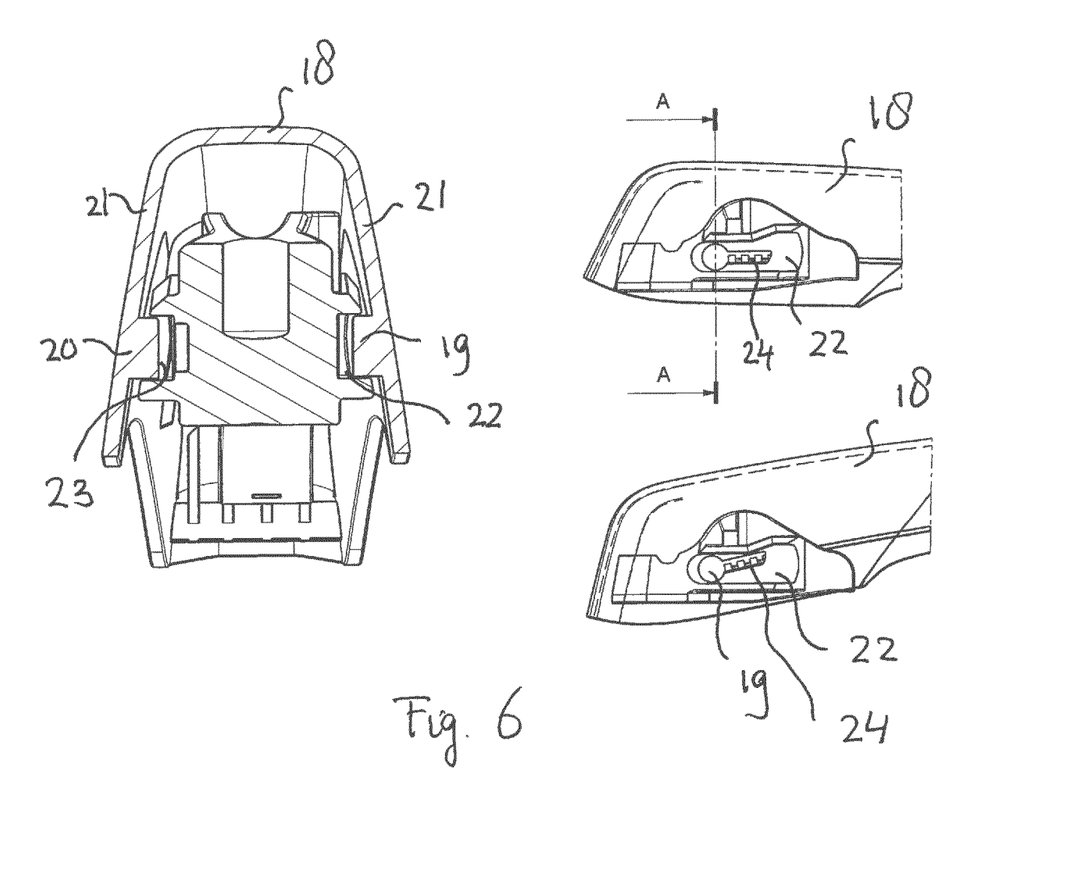
FIG. 6 shows several cross-sectional views of the mounting head shown in FIGS. 1 and 2.

With particular reference to FIGS. 3 and 5, the second part 10 comprises a resilient tongue 13 extending outwardly, so that the tongue 13 engages in an identically shaped hole 14 provided in the flat strip 8. The connecting device 6 with the wiper blade 2 is mounted onto the mounting head 7 as follows. The second part 10 can be easily slid on a free end of the flat strip 8. During this sliding movement, the resilient tongue 13 is initially pushed in against a spring force and then allowed to spring back into the hole 14 in the flat strip 8, thus snapping, that is clipping, the resilient tongue 13 into the hole 14 of the flat strip 8. This is a so-called bayonet-connection. The flat strip 8 together with the second part 10 may then be clipped onto the first part 9 in order to be ready for use. Dismounting the wiper blade 2 from the second part 10 is thus realized by unclipping the first part 9 together with the wiper blade 2 from the second part 10 with the flat strip 8.

Figure 4:
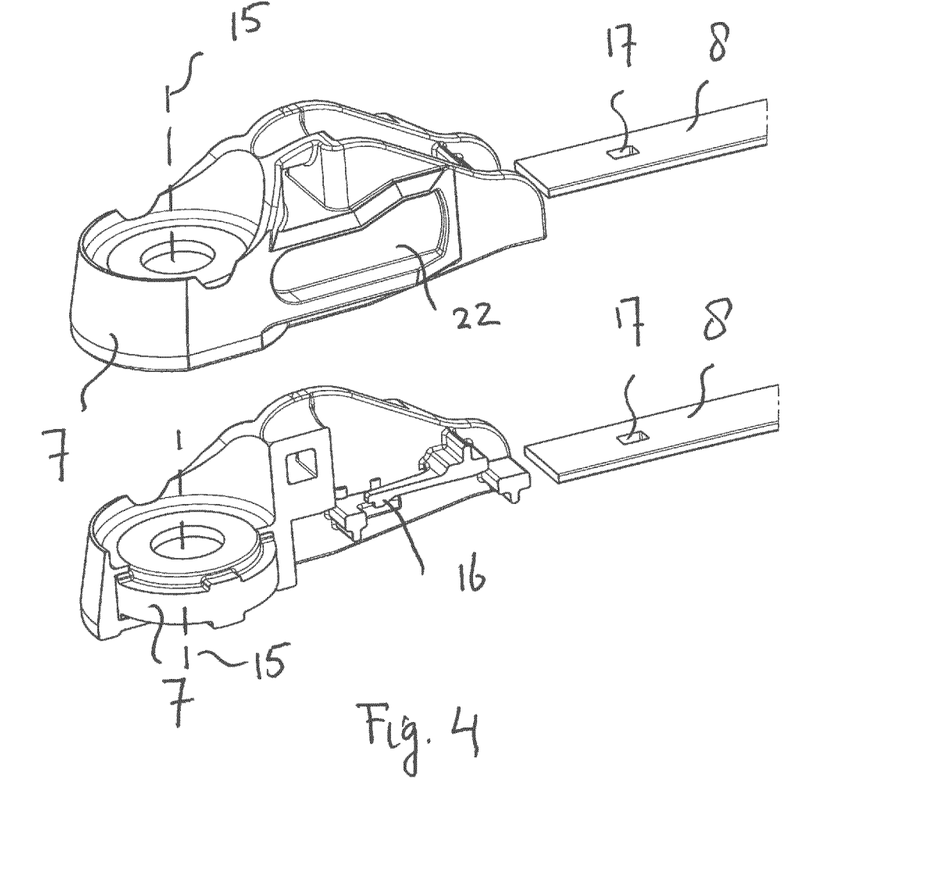
FIG. 4 shows a perspective view of a part of the windscreen wiper device of FIGS. 1 and 2, partly in cross-section, showing the interconnection of the strip-shaped arm and a mounting head.

As illustrated particularly in FIG. 4, the windscreen wiper device 1 according to the invention comprises a plastic or metallic mounting head 7 which can be fixed for rotation to a shaft 15 driven, via a mechanism not illustrated, by a small motor. In use, the shaft 15 rotates alternately in a clockwise and in a counter-clockwise sense carrying the mounting head 7 into rotation also, which in turn draws the connecting device 6.

Referring to FIG. 4, the mounting head 7 comprises a resilient tongue 16 extending outwardly, so that the tongue 16 engages in an identically shaped hole 17 provided in the flat strip 8. The flat strip 8 is mounted onto the mounting head 7 as follows. The mounting head 7 can be easily slid on another free end of the flat strip 8. During this sliding movement the resilient tongue 16 is initially pushed in against a spring force and then allowed to spring back into the hole 17 in the flat strip 8, thus snapping, that is clipping, the resilient tongue 16 into the hole 17 of the flat strip 8. This is a so-called bayonet-connection. Dismounting the flat strip 8 from the mounting head 7 is thus realized by unclipping the flat strip 8 from mounting head 7.

Figure 7:
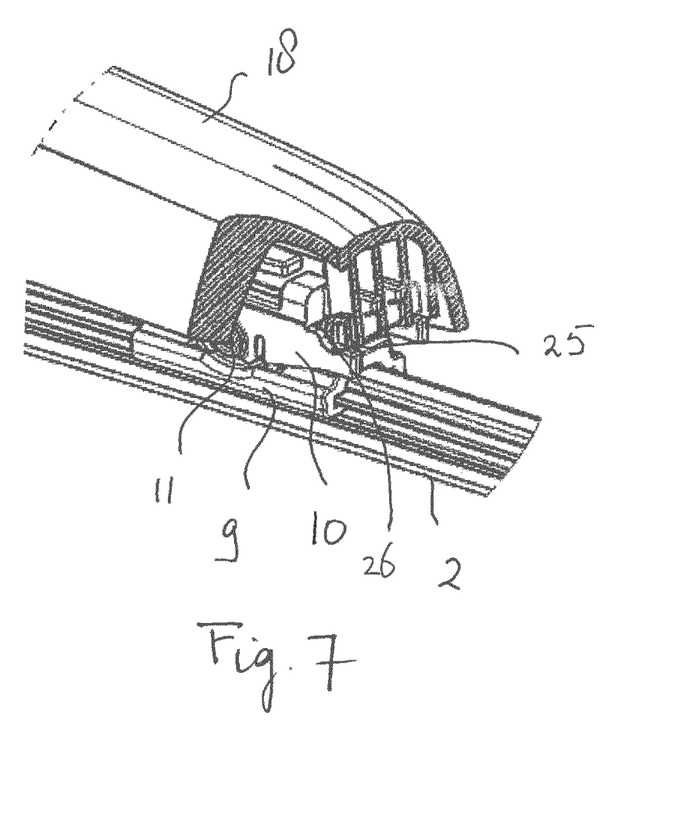
FIG. 7 shows a perspective view of a portion of the windscreen wiper device of FIGS. 1 and 2 to illustrate the mounting and dismounting of a cap.

With reference to FIGS. 1, 2, 5 and 6, a cap 18 is provided with inwardly extending protrusions 19, 20 on opposite walls 21 of the cap 18. The mounting head 7 has an at least substantially U-shaped cross-section at the location of its attachment to the arm 8. Each leg of the U-shaped cross-section comprises a guiding groove 22, 23 cooperating with the protrusions 19, 20. The protrusions 19, 20 each comprises a lateral rib 24 to limit movement of the arm 8 in a direction away from a windscreen to be wiped from a wiping position into a lift(ing) position. This limitation in movement serves to not overstress the arm 8. As shown in FIGS. 5 and 7, the cap 18 is provided with an axis 25 extending in a transverse direction and pivotally engaging into a hole 26 of the second part 10 having an open circumference. Hence, upon clipping ("snapping") the axis 25 of the cap 18 inside the hole 26 of the second part 10, the cap 18 can be pivoted back towards the mounting head 7 in order to clip ("snap") the protrusions 19, 20 of the cap 18 inside the guiding grooves 22, 23 of the mounting head 7. The interconnection between the cap 18 and the mounting head 7 has a longitudinal freedom in order to lift the arm 8 into the lifting position.

The invention is not restricted to the variants shown in the drawing, but it also extends to other embodiments that fall within the scope of the appended claims.

The invention claimed is:

1. A windscreen wiper device comprising:
   an elongated wiper blade of a flexible material, adapted to be placed in abutment with a windscreen to be wiped, wherein said wiper blade includes at least one groove in which an elastic, elongated carrier element is disposed, a connecting device connected to said wiper blade;
   a mounting head for transferring a reciprocal movement to said wiper blade; and
   a longitudinal strip-shaped arm having a first end detachably connected to said mounting head through a snapping operation and a second end detachably connected to said connecting device through a snapping operation, wherein said arm is made of a resilient material and is biased to exert a pressure onto said wiper blade towards the windscreen to be wiped, wherein said mounting head comprises at least one resilient tongue engaging in a correspondingly shaped hole provided in said arm near said first end thereof, and wherein said resilient tongue is hingeable between a wiping position retaining said arm onto said mounting head and a lift position releasing said arm from said mounting head.

2. The windscreen wiper device according to claim 1, wherein said connecting device comprises at least one resilient tongue engaging in a correspondingly shaped hole provided in said arm near said second end thereof, wherein said resilient tongue is hingeable between a wiping position retaining said wiper blade onto said arm and a lift position releasing said wiper blade from said arm.

3. The windscreen wiper device according to claim 2, wherein said hole has a closed circumference.

4. The windscreen wiper device according to claim 2, wherein said resilient tongue extends in a longitudinal direction away from said mounting head.

5. The windscreen wiper device according to claim 2, wherein said connecting device, comprises a first part and a second part, wherein said arm, can be pivotally connected to said first part about a pivot axis, with the interposition of said second part, wherein said second part comprises said resilient tongue, wherein said first part is connected to said wiper blade and said second part is detachably connected to said first part.

6. The windscreen wiper device according to claim 5, wherein said second part is detachably connected to said first part by pivotally engaging protuberances of said first part, at the location of said pivot axis, in recesses provided in said second part.

7. The windscreen wiper device according to claim 6, wherein said second part has a substantially U-shaped cross-section, wherein a base of said U-shaped cross-section comprises said resilient tongue, and wherein legs of said U-shaped cross-section comprise said recesses.

8. The windscreen wiper device according to claim 1, wherein said hole has a closed circumference.

9. The windscreen wiper device according to claim 1, wherein said resilient tongue extends in a longitudinal direction towards said mounting head.

10. The windscreen wiper device according to claim 1, wherein said mounting head is fixed for rotation to a shaft, and wherein said shaft is rotatable alternately in a clockwise and in a counter-clockwise sense carrying said mounting head into rotation.

11. The windscreen wiper device according to claim 1, wherein said mounting head is fixed for translation to a carriage, and wherein said carriage can be translated alternately in a linear direction and a counter linear direction carrying said mounting head into translation.

12. The windscreen wiper device according to claim 1, wherein an elongated cap is connected to at least one of said mounting head, said arm and said connecting device.

13. The windscreen wiper device according to claim 12, wherein said mounting head has two opposite side walls at the location of its attachment to said cap, wherein each side wall comprises a guiding groove cooperating with an inwardly extending protrusion on a wall of said cap.

14. The windscreen wiper device according to claim 13, wherein said protrusion comprises a lateral rib to limit movement of said arm in a direction away from the windscreen to be wiped from a wiping position into a lifting position.

15. The windscreen wiper device according to claim 1, wherein said windscreen wiper device further comprises two connecting pieces each positioned near an end of said wiper blade and connected to an end of said carrier element.

16. A strip-shaped arm arranged to be directly and detachably connected near a first end thereof to a mounting head of a windscreen wiper device through a snapping operation and arranged to be directly and detachably connected near a second end thereof to a connecting device of a wiper blade of a windscreen wiper device through a snapping operation, said arm being made of a resilient material and biased in order to exert a pressure onto the wiper blade towards a windscreen to be wiped, wherein:
  said arm comprises a first hole and a second hole,
  said first hole is adapted to cooperate with a resilient tongue of the connecting device that is movable between a wiping position retaining the wiper blade onto said arm and a lift position releasing the wiper blade from said arm, and
  said second hole is adapted to cooperate with a resilient tongue of the mounting head that is movable between a wiping position retaining said arm onto the mounting head and a lift position releasing said arm from the mounting head.

* * * * *